United States Patent
Dudzinski et al.

(10) Patent No.: US 11,280,159 B2
(45) Date of Patent: Mar. 22, 2022

(54) CAPTURED BALL VALVE MECHANISM

(71) Applicant: Parker-Hannifin Corporation, Cleveland, OH (US)

(72) Inventors: Paul Dudzinski, Meriden, CT (US); Ken Cornett, Ivoryton, CT (US); Dan Funke, San Diego, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 298 days.

(21) Appl. No.: 16/611,004

(22) PCT Filed: May 23, 2018

(86) PCT No.: PCT/US2018/034077
§ 371 (c)(1),
(2) Date: Nov. 5, 2019

(87) PCT Pub. No.: WO2019/013871
PCT Pub. Date: Jan. 17, 2019

(65) Prior Publication Data
US 2020/0080399 A1    Mar. 12, 2020

Related U.S. Application Data (60) Provisional application No. 62/531,464, filed on Jul. 12, 2017.

(51) Int. Cl.
*E21B 34/14* (2006.01)
*F16K 5/06* (2006.01)

(52) U.S. Cl.
CPC ............ *E21B 34/14* (2013.01); *F16K 5/0647* (2013.01); *E21B 2200/04* (2020.05)

(58) Field of Classification Search
CPC ..... E21B 34/14; E21B 2200/00; F16K 5/0647
See application file for complete search history.

(56) References Cited

U.S. PATENT DOCUMENTS

| 3,543,793 A | 12/1970 | Dollison |
| 4,254,836 A | 3/1981 | Russell |

(Continued)

FOREIGN PATENT DOCUMENTS

| WO | 2014/062546 | 4/2014 |

OTHER PUBLICATIONS

International Search Report issued by WIPO in corresponding application No. PCT/US2018/034077 and dated Nov. 30, 2018.

(Continued)

*Primary Examiner* — Michael R Wills, III
(74) *Attorney, Agent, or Firm* — Renner, Otto, Boisselle & Sklar, LLP (57) ABSTRACT

A flow control mechanism includes a housing defining a through bore and a cavity contiguous with the through bore, and a barrier received within the cavity of the housing. The barrier is moveable between a sealing position in which fluid flow through the housing is permitted in one direction through the housing and blocked in an opposite direction, and a non-sealing position in which the flow control mechanism is configured to receive an attachment member. An actuating mechanism returns the barrier to the sealing position when the attachment member separates. The actuating mechanism may be an elastomeric band that is in a non-stretched state when the barrier is in the sealing position and in a stretched state when the barrier is in the non-sealing position. The barrier returns from the non-sealing position to the sealing position by action of torque of the stretched flexible member as the flexible member returns to the non-stretched state.

10 Claims, 5 Drawing Sheets

(56) References Cited

U.S. PATENT DOCUMENTS

| | | | |
|---|---|---|---|
| 4,457,379 A | 7/1984 | McStravick | |
| 4,846,221 A | 7/1989 | Kanemaru | |
| 6,491,116 B2 | 12/2002 | Berscheidt et al. | |
| 6,866,100 B2* | 3/2005 | Gudmestad | E21B 34/12 166/316 |
| 7,051,813 B2 | 5/2006 | Hayes et al. | |
| 8,590,616 B1 | 11/2013 | McClinton et al. | |
| 9,004,185 B2* | 4/2015 | Madero | E21B 33/12 166/386 |
| 9,506,319 B2 | 11/2016 | Kalb et al. | |
| 2002/0096365 A1 | 7/2002 | Berscheidt et al. | |
| 2004/0206404 A1 | 10/2004 | Yang | |
| 2009/0044957 A1 | 2/2009 | Clayton et al. | |
| 2011/0277989 A1 | 11/2011 | Frazier | |
| 2012/0279700 A1 | 11/2012 | Frazier | |
| 2013/0009085 A1* | 1/2013 | Kuzelka | F16K 5/0605 251/315.06 |

OTHER PUBLICATIONS

Titan Petro Services 2019, *Razerback Series*, Caged Ball Frac Plug Configuration, <http://www.titanpetroservices.com/services/completion-plugs/caged-ball>.

\* cited by examiner

CAPTURED BALL VALVE MECHANISM

RELATED APPLICATIONS

This application is a national stage application pursuant to 35 U.S.C. § 371 of PCT/US2018/034077 filed on May 23, 2018, which claims the benefit of U.S. Provisional Application No. 62/531,464 filed Jul. 12, 2017, which is incorporated herein by reference.

FIELD OF INVENTION

The present invention relates to down hole plug seals to isolate zones during drilling operations and other well service, and particularly to plug seals with captured or caged balls, or with plug seals incorporating valves that allow flow in one direction.

BACKGROUND OF THE INVENTION

In oil and gas drilling operations, a variety of down hole tools are used for the manufacturing, operation, and maintenance of such drilling systems. One example of a down hole tool is a plug seal, which can be used to seal and isolate certain portions of a drilled well from other portions of the well. A sealing plug that fully isolates one well portion (e.g., a down hole portion) from another well portion (e.g., an up hole portion), wholly blocking flow between the two portions, is commonly referred to as a bridge plug. Other types of plug seals may allow flow in a particular direction (e.g., upstream), but block flow in other directions (e.g., downstream). Plug seals may be permanent, or may be non-permanent dissolving or otherwise removable plug seals.

Hydraulic fracturing (commonly referred to as "fraccing" or "fracking") is becoming a common method of oil and gas well stimulation, which may employ bridge plugs to operate different portions of a well. For example, a bridge plug may be located within an outer well casing so as to isolate a down hole portion of a well from an up hole portion of the well. In the up hole portion, the well casing may include a plurality of transverse holes that open into a surrounding rock formation. In the hydraulic fracturing process, pressurized fluid is pumped down into the well. At the bridge plug, flow is blocked from proceeding from the up hole portion into the down hole portion, pressurizing the well. Under such pressure, the fluid is forced through the holes in the up hole well casing into the adjacent rock formation. The pressurized flow into the rock formation in turn creates cracks through which oil and gas may be extracted.

Conventional caged ball directional flow valves have been limited to traditional plug designs that have a mandrel running the full length of the plug and a small through bore. The ball is usually of a small diameter so that it can fit within the central portion of the mandrel and allow the setting tool to attach to the outer surfaces of the mandrel. The forces generated by the setting tool during the setting process load the mandrel in tension. There is usually a cage, or some other means of retention, that keeps the ball constrained to a small amount of movement within the mandrel. The ball is allowed to move a small amount away from the seat to allow flow in a particular direction and to seat and seal in the opposing direction.

Many of the newer plug designs, such as large bore frac plugs, allow the setting tool to pass through the inner diameter to attach to the far end of the plug. This type of tool attachment prevents loading of the plug in tension and allows the plug to be designed with thinner components. These designs do not lend themselves to the use of caged balls, however, because the setting tool passes through the center of the plug where the ball would normally reside.

SUMMARY OF THE INVENTION

The present invention provides an improved captured ball directional flow valve mechanism that overcomes deficiencies of conventional caged ball mechanisms. The captured ball can be oriented to provide a pathway for the setting tool to pass through the center of the plug for setting, and then re-orient after separating from the setting tool, to seal against fluid flow. Once in the sealing orientation, the ball can seal in one direction and allow flow in the other direction by moving off the seat.

An aspect of the invention, therefore, is a captured ball valve assembly. In exemplary embodiments, the captured ball valve mechanism is shown independent of a plug sealer. The captured ball valve mechanism includes a housing with a through bore, ball nest, slots, and a seat; a ball with a hole through it, a slot, and trunnion pins; and an elastomeric band that provides the orientation function. The housing can either be built into the frac plug assembly, or it can be a discrete component that attaches to the frac plug assembly. The seat feature machined into the housing allows the ball to seal against the seat in a fluid tight configuration. The housing also contains slots that allow the ball trunnion pins to engage with the housing to keep the ball captured within the housing. The ball trunnion pins can rotate freely within the slots, and also move linearly within the slots, to reorient and reposition the ball. The length and position of the slots determine the placement of the ball and the amount of linear movement that the ball can achieve. The elastomeric band has boss ends that anchor in the slots of the housing. The boss ends keep the band placed in a position on the housing and allow the band to re-orient the ball into the correct dealing orientation, when the assembly is free of the setting tool. The boss ends also resist the tension generated when the band is stretched to allow the ball to rotate into the setting position.

Another aspect of the invention is a setting process and sealing function for a frac plug with a captured ball mechanism. In exemplary embodiments, the setting process includes the steps attaching a plug assembly with a captured ball mechanism to a setting tool; locating the plug assembly at a desired position within a well casing; setting the plug assembly; separating the setting tool from the plug assembly, wherein the ball reorients from the setting position to the sealing position; and introducing of pressurized fluid to perform the well treatment.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present invention will now be described with reference to the drawings, wherein like reference numerals are used to refer to like elements throughout. It will be understood that the figures are not necessarily to scale.

Generally, an aspect of the invention is an enhanced flow control mechanism having a barrier that can return to a sealing position from a non-sealing position automatically upon removing an attachment member of a setting tool from a plug assembly containing the flow control mechanism. In exemplary embodiments, the flow control mechanism includes a housing defining a through bore and a cavity contiguous with the through bore; a barrier received within the cavity of the housing; wherein the barrier is moveable between a sealing position in which fluid flow through the housing is permitted in one direction through the housing and blocked in an opposite direction, and a non-sealing position in which the flow control mechanism is configured to receive an attachment member; and an actuating mechanism that returns the barrier from the non-sealing position to the sealing position when the attachment member separates. The actuating mechanism may include a flexible member, such as an elastomeric band that is in a non-stretched state when the barrier is in the sealing position and in a stretched state when the barrier is in the non-sealing position. When the attachment member separates from the plug assembly containing the flow control mechanism, the barrier returns from the non-sealing position to the sealing position by action of torque of the stretched flexible member as the flexible member returns to the non-stretched state.

Figure 1:
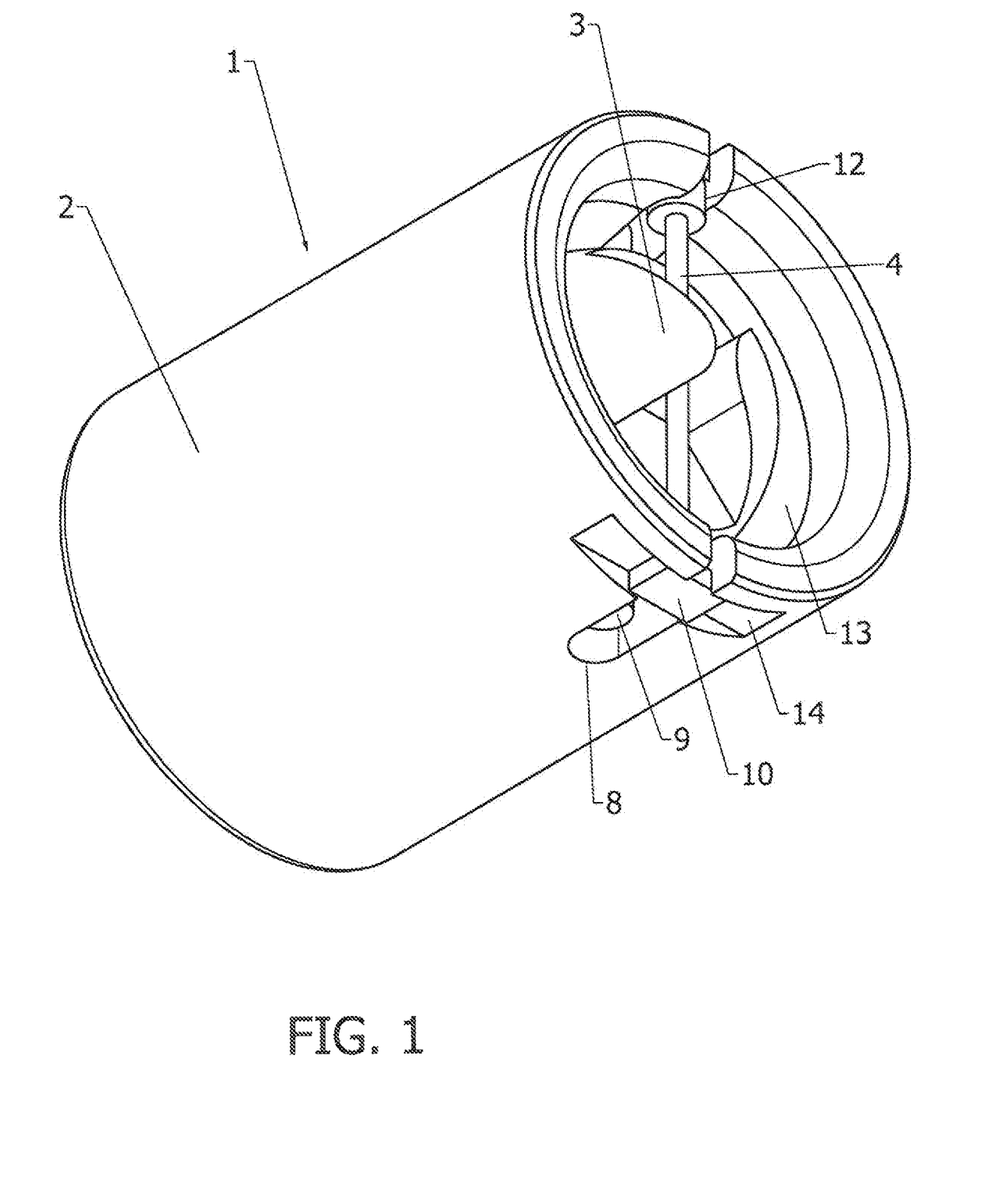
FIG. 1 is a drawing depicting an isometric view of an exemplary captured ball assembly in a sealing configuration in accordance with embodiments of the present invention.
Figure 2:
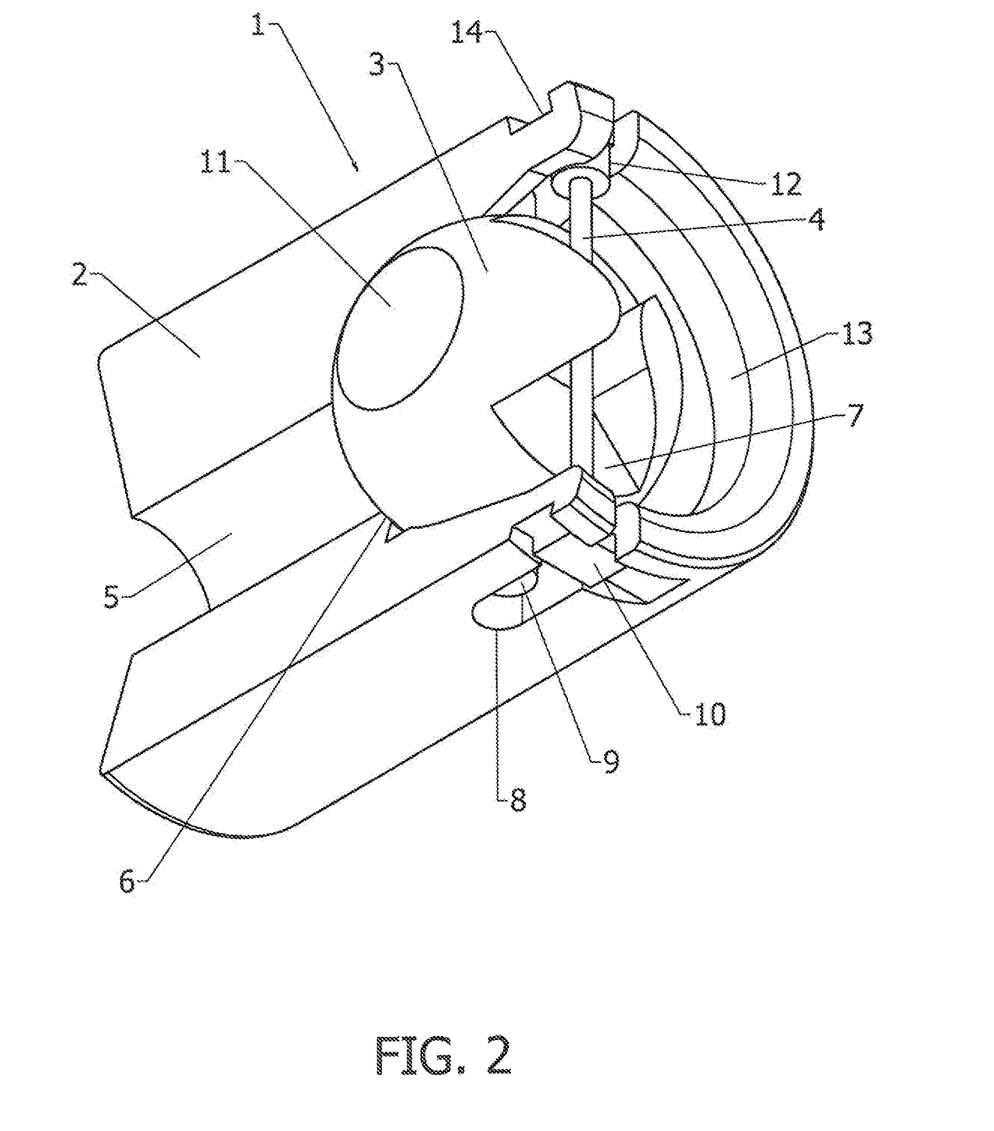
FIG. 2 is a drawing depicting an isometric view of the captured ball assembly of FIG. 1, with a portion of the housing cut away to provide a view of internal features.

FIG. 1 is a drawing depicting an isometric view of an exemplary flow control mechanism 1 configured for sealing in accordance with embodiments of the present invention. FIG. 2 is a drawing depicting an isometric view of the flow control mechanism of FIG. 1, with a portion of the housing cut away to provide a view of internal features. In an exemplary embodiment, the flow control mechanism 1 may be configured as a captured ball assembly 1. Both drawings depict the captured ball assembly in a default sealing configuration. In exemplary embodiments, the flow control mechanism 1 includes a housing 2, a barrier 3, and an actuating mechanism 4 which may be configured as a flexible member including an elastomeric band. When the flow control mechanism 1 is configured as a captured ball assembly, the barrier 3 is configured as a sealing ball with the flexible member or elastomeric band operating as an actuating mechanism for acting on the sealing ball as further detailed below.

Figure 4:
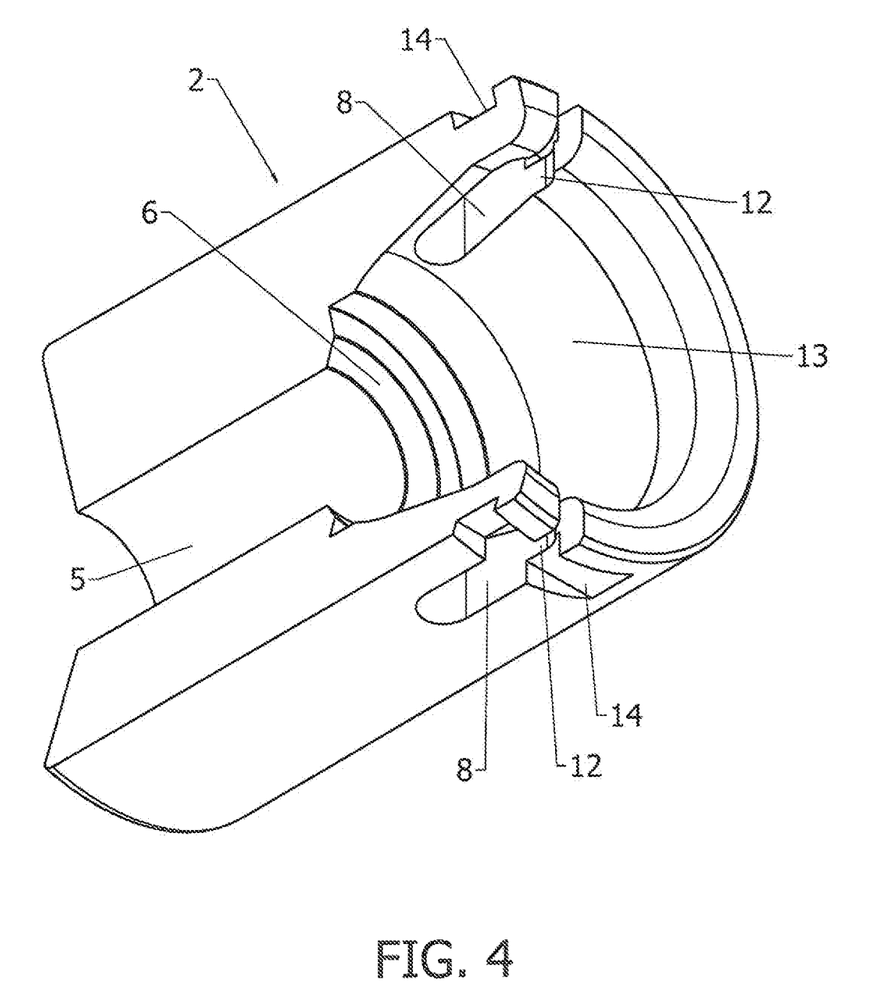
FIG. 4 is a drawing depicting an isometric view of an exemplary housing of the captured ball assembly in isolation, with a portion cut away to provide a view of internal features.

FIG. 4 is a drawing depicting an isometric view of the housing 2 of the captured ball assembly in isolation, with a portion cut away to provide a view of internal features. Referring for example to FIGS. 1-2 and 4, housing 2 has a through bore 5 that is contiguous with a sealing ball cavity 13, with the sealing ball cavity 13 extending toward the opposing end of the housing 2 relative to the through bore 5. As further detailed below, the cavity 13 is configured to receive the barrier 3, such as a sealing ball. Housing 2 also has slots 8 machined into either end of the housing adjacent to the sealing ball cavity 13. As also further explained below, slots 8 are configured to act as guides for the sealing ball's trunnion pins 9 to capture the ball 3 in cavity 13 and to allow the ball to rotate and translate, while nested within the cavity 13. The housing 2 further includes grooves 12 and 14 that also provide an anchor point for boss ends 10 of the flexible member 4. Housing 2 also has a seat 6 that acts as a sealing point for the ball 3 at an intersection of the through bore 5 and cavity 13. The housing can either be built into a frac plug assembly, or the housing can be a discrete component that attaches to a frac plug assembly.

Figure 5:
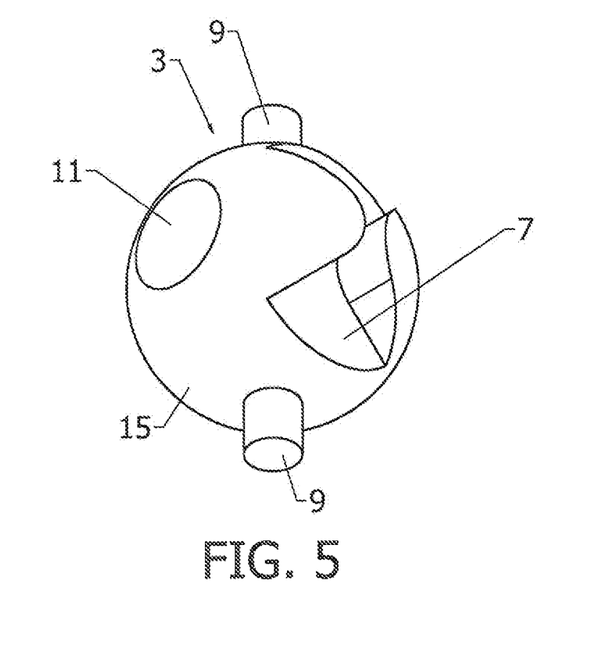
FIG. 5 is a drawing depicting an isometric view of an exemplary sealing ball of the captured ball assembly in isolation.

FIG. 5 is a drawing depicting an isometric view of the barrier 3 of the captured ball assembly in isolation, configured in this example as a sealing ball. Referring for example to FIGS. 1-2 and 5, sealing ball 3 nests inside sealing ball cavity 13 within the housing 2. Sealing ball 3 has a through hole 11 that allows a setting tool attachment member (not shown) to pass through the sealing ball. The sealing ball 3 also has trunnion pins 9 that are positioned perpendicular to the through hole 11. Sealing ball 3 also has a barrier slot 7 that is positioned perpendicular to the through hole 11 and aligned with the trunnion pins 9. The spherical surface diametrically opposed from barrier slot 7 provides a sealing surface 15 that makes contact with the housing seat 6 to seal fluid in the sealing configuration shown in FIGS. 1 and 2.

Figure 6:
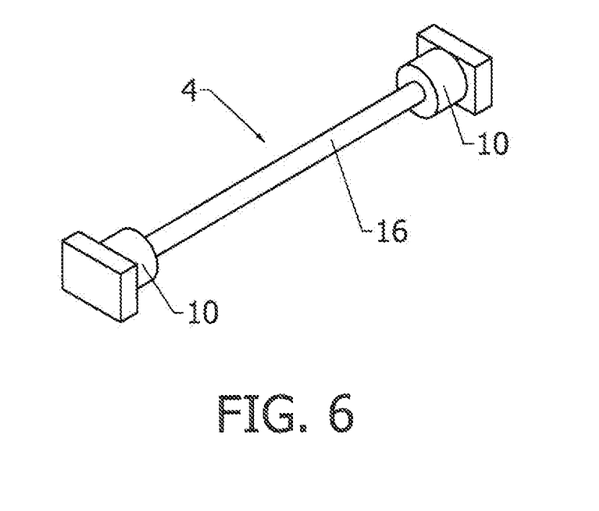
FIG. 6 is a drawing depicting an isometric view of an exemplary flexible member configured as an elastomeric band of the captured ball assembly in isolation.

As referenced above, an actuating mechanism is provided to move the barrier from the non-sealing position to the sealing position upon removing the setting tool attachment member. In exemplary embodiments, the actuating mechanism may be configured as a flexible member. FIG. 6 is a drawing depicting an isometric view of an exemplary flexible member of the captured ball assembly in isolation. Referring for example to FIGS. 1-2 and 6, the flexible member 4 may be configured as an elastomeric band 16 that has boss ends 10. The elastomeric band attaches to the grooves 12 and 14 on housing 2 by insertion of the boss ends 10 into the opposing grooves 12 and 14 of the housing. The elastomeric band 16 passes through the barrier slot 7 of the sealing ball to bridge the sealing ball cavity 13. The elastomeric band 16 may be configured in a first state in which the elastomeric band is not stretched as shown in FIGS. 1 and 2, and in a second state (see FIG. 3) in which the elastomeric band is stretched.

Accordingly, as referenced above FIGS. 1 and 2 depict the flow control mechanism (captured ball assembly) 1 in a first sealing configuration. In such sealing configuration, the barrier 3 is in a first sealing position in which the barrier 3 seals against the seat 6 of the housing, and in particular the spherical surface 15 of the sealing ball 3 is pressed against the seat 6 of the housing. In such position, through hole 11 of the sealing ball is essentially perpendicular to the through bore 5 of the housing. The flexible member 4 also is retained in a non-stretched state. In this first sealing state, the barrier or sealing ball 3 blocks flow from the upstream side of the cavity 13 across the barrier 3 to the downstream side of the through bore 5. The barrier 3, however, is permitted to translate off the seat 6 along the cavity 13 in a modest amount to permit one-way flow from the downstream side of the through bore 5 around the barrier to the upstream side of the cavity 13. The length and position of the slots 8 in the housing 2 determine the placement of the ball and the amount of linear movement that the ball can achieve to permit the one-directional fluid flow.

Figure 3:
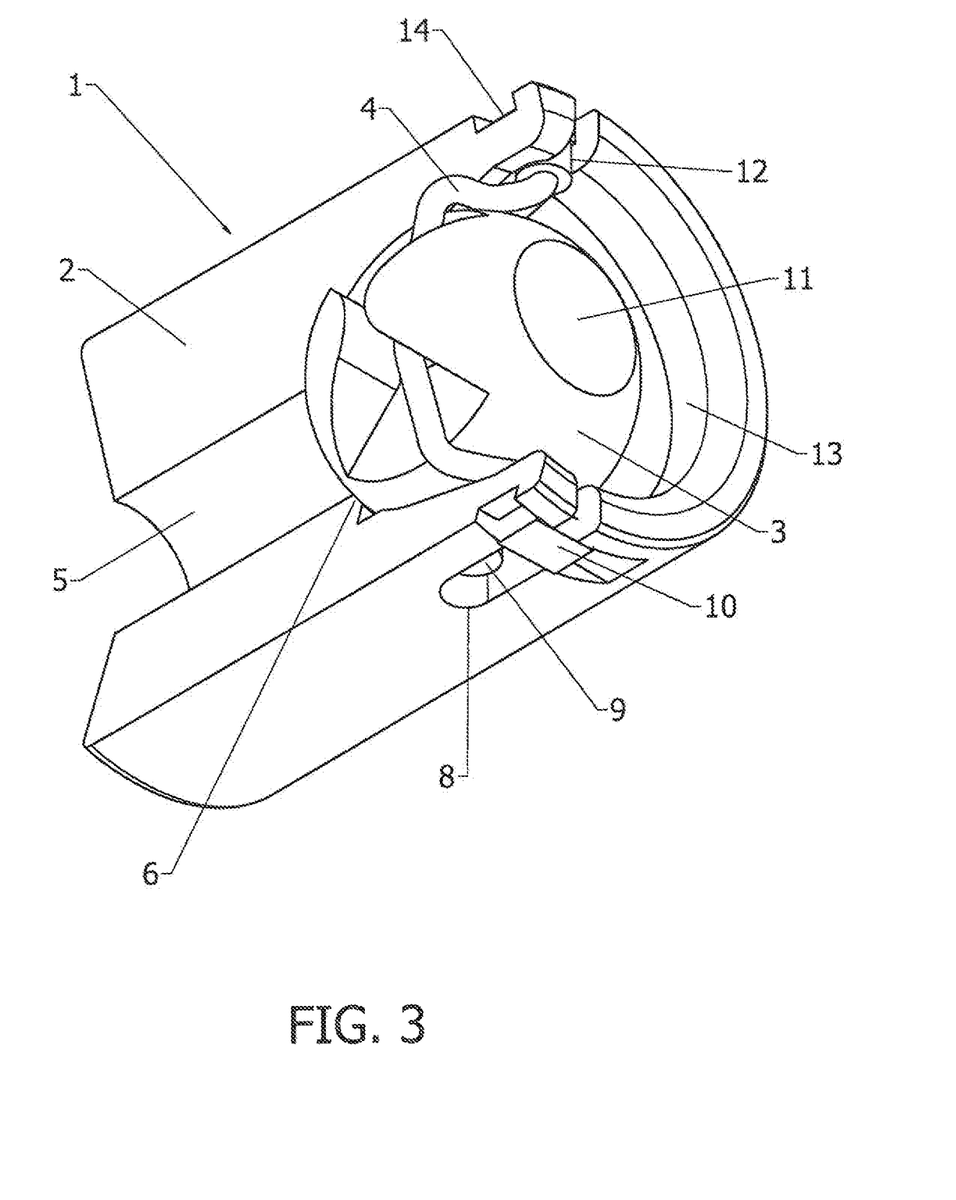
FIG. 3 is a drawing depicting an isometric view of the captured ball assembly of FIG. 1, but in a setting configuration, with a portion of the housing cut away to provide a view of internal features.

FIG. 3 is a drawing depicting an isometric view of the flow control mechanism (captured ball assembly) 1 in a second setting configuration, with a portion of the housing sectioned to provide a view of the internal features. The setting configuration is achieved by rotating the barrier or sealing ball 3 to a second non-sealing position in which the through hole 11 is aligned with the through bore 5. The middle portion elastomeric band 16 of flexible member 4 is in a second stretched state, in which the elastomeric band 16 is engaged with barrier slot 7 of sealing ball 3. Accordingly, rotation of sealing ball 3 stretches the elastomeric band 16 into the stretched state and creates a torque load about the sealing ball's trunnion pins 9. This torque loads the sealing ball in the direction that would return the sealing ball to its original sealing orientation. The sealing ball can only remain in the setting position if constrained by something, such as the attachment member of a setting tool.

To perform setting, therefore, an operator topside of a well, for example, can move the barrier (sealing ball) into the setting position. The operator then can insert an attachment member of the setting tool through the through hole 11 and attach said attachment member to the housing 2 or a related component of the broader plug assembly. The setting tool is then moved down the well casing with the flow control mechanism as part of the plug assembly, which is set at the desired position. When the setting tool is removed, the actuating mechanism (flexible member/elastomeric band) operates to move the barrier back into the sealing position, i.e., the elastomeric band rotates the sealing ball back into the sealing position.

Accordingly, a method of setting a plug assembly including the flow control mechanism includes the steps of rotating the barrier from the sealing position to the setting position, thereby aligning the through hole of the barrier with the through bore of the housing and moving the flexible member from a non-stretched state into a stretched state; inserting an attachment member of a setting tool through the aligned through hole and through bore and attaching the attachment member to the plug assembly; locating the flow control mechanism into a determined location; and separating the attachment member from plug assembly to remove the setting tool. When the attachment member of the setting tool separates from the plug assembly and the setting tool is removed, the barrier returns or snaps back to the sealing position by action of the torque of the stretched flexible member as the flexible member returns to the non-stretched state. When the flow control mechanism is utilized as part of a plug seal assembly or frac plug for a well casing, pressurized fluid can then be introduced for well treatment.

For a plug assembly with a captured ball mechanism to be attached to a setting tool, the ball thus needs to be rotated so that the through hole in the sealing ball aligns with the through bore in the housing, which typically is performed by an operator topside. Rotating the ball into this orientation stretches the elastomeric band and creates a torque load on the ball. The attachment member of the setting tool enters the plug assembly on the upstream side, to pass through the hole in the ball, pass through the bore at the center of the housing and reach the far, or downstream, end of the plug assembly and attach to the housing or plug assembly through some break away means. The plug assembly remains attached to the setting tool and both are sent down the well bore to the desired position. When the plug/setting tool assembly arrives at the intended location, the setting tool is actuated to generate a load that forces the plug to expand to the well casing to anchor it in place and to seal against the casing. The setting tool load then increases to release the setting tool attachment member from the plug assembly at the break away feature on the downstream end of the plug assembly. The attachment member of the setting tool then pulls through the bore of the plug assembly, pulls through the hole in the sealing ball, and ultimately the setting tool separates and moves away from the plug assembly and back to the surface.

Once the setting tool is clear of the plug assembly, the torque generated by the elastomeric band forces the sealing ball to rotate into an orientation that creates the least stretch on the band. This is the orientation in which the slot of the sealing ball is aligned with the location of the non-stretched elastomeric band. This is also the orientation in which sealing surface of the ball is aligned with the seat on the housing. The ball is now constrained in rotation by the elastomeric band, but able to move linearly by a small amount within the housing bore to permit one-directional flow. Pressurized fluid arriving from the well head will push the ball against the seat and cause the ball to seal tightly, thereby isolating the portion of the well on the downstream side. Relieving pressure at the well head will cause the ball to move away from the seat and allow fluid from the downstream side of the well to flow through the plug assembly toward the well head.

An aspect of the invention, therefore, is an enhanced flow control mechanism having a barrier that can return to a sealing position from a non-sealing position automatically upon removing an attachment member of a setting tool from a plug assembly containing the flow control mechanism. In exemplary embodiments, the flow control mechanism includes a housing defining a through bore and a cavity contiguous with the through bore; a barrier received within the cavity of the housing; wherein the barrier is moveable between a sealing position in which fluid flow through the housing is permitted in one direction through the housing and blocked in an opposite direction, and a non-sealing position in which the flow control mechanism is configured to receive an attachment member; and an actuating mechanism that returns the barrier from the non-sealing position to the sealing position when the attachment member separates from the flow control mechanism. The flow control mechanism may include one or more of the following features, either individually or in combination.

In an exemplary embodiment of the flow control mechanism, the actuating mechanism comprises a flexible member that is in a non-stretched state when the barrier is in the sealing position and in a stretched state when the barrier is in the non-sealing position; and when the attachment member separates from the flow control mechanism, the barrier returns from the non-sealing position to the sealing position by action of torque of the stretched flexible member as the flexible member returns to the non-stretched state.

In an exemplary embodiment of the flow control mechanism, the housing defines opposing grooves for anchoring the flexible member.

In an exemplary embodiment of the flow control mechanism, the flexible member includes boss ends that anchor the flexible member within the grooves.

In an exemplary embodiment of the flow control mechanism, the housing defines opposing slots and the barrier includes opposing trunnion pins that extend perpendicularly to the through hole, and the trunnion pins are received within the opposing slots to permit the barrier to rotate and translate by movement of the trunnion pins within the slots.

In an exemplary embodiment of the flow control mechanism, the housing includes a seat at an intersection of the through bore and the cavity, and the barrier has a sealing surface that rests against the seat when the barrier is in the sealing position.

In an exemplary embodiment of the flow control mechanism, the barrier defines a barrier slot opposite to the sealing surface, and the actuating mechanism comprises an elastomeric band that extends through the barrier slot.

In an exemplary embodiment of the flow control mechanism, the barrier has a through hole that is perpendicular with the through bore of the housing when the barrier is in the sealing position, and the through hole of the barrier is aligned with the through bore of the housing when the barrier is in the non-sealing position to permit passage of the attachment member through the barrier when in said non-sealing position.

In an exemplary embodiment of the flow control mechanism, the barrier is configured as a spherical sealing ball.

Another aspect of the invention is a method of setting a plug assembly including the referenced flow control mechanism. In exemplary embodiments, the setting method includes the steps of: moving the barrier from a sealing position to a non-sealing position, thereby aligning a through hole of the barrier with the through bore of the housing and moving the actuating mechanism into an actuating state; inserting an attachment member of a setting tool through the aligned through hole and through bore and attaching the attachment member of the setting tool to the plug assembly; locating the plug assembly at a determined location; and separating the attachment member of the setting tool from the plug assembly to remove the setting tool; wherein when the attachment member of the setting tool separates from the plug assembly and the setting tool is removed, the barrier returns back to the sealing position by action of the actuating mechanism. The setting method may include one or more of the following features, either individually or in combination.

In an exemplary embodiment of the setting method, the actuating mechanism comprises a flexible member, and: when the barrier member is moved from the sealing position to the non-sealing position, the flexible member is moved from a non-stretched state into a stretched state; and when the attachment member of the setting tool separates from the plug assembly and the setting tool is removed, the barrier returns to the sealing position by action of torque of the stretched flexible member as the flexible member returns to the non-stretched state.

In an exemplary embodiment of the setting method, the barrier is a sealing ball, and the sealing ball rotates within the cavity between sealing position and the non-sealing position.

In an exemplary embodiment of the setting method, the barrier has a through hole that is perpendicular with the through bore of the housing when the barrier is in the sealing position, and the through hole of the barrier is aligned with the through bore of the housing when the barrier is in the non-sealing position to permit passage of the attachment member of the setting tool through the barrier when in said non-sealing position.

In an exemplary embodiment of the setting method, the flow control mechanism is introduced into a well bore and locked into a well casing at specifically selected positions.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flow control mechanism comprising:
a housing defining a through bore and a cavity contiguous with the through bore;
a barrier received within the cavity of the housing;
wherein the barrier is moveable between a sealing position in which fluid flow through the housing is permitted in one direction through the housing and blocked in an opposite direction, and a non-sealing position in which the flow control mechanism is configured to receive an attachment member; and
an actuating mechanism that returns the barrier from the non-sealing position to the sealing position when the attachment member separates from the flow control mechanism;
wherein the barrier has a through hole that is perpendicular with the through bore of the housing when the barrier is in the sealing position, and the through hole of the barrier is aligned with the through bore of the housing when the barrier is in the non-sealing position to permit passage of the attachment member through the barrier when in said non-sealing position.

2. The flow control mechanism of claim 1,
wherein the actuating mechanism comprises a flexible member that is in a non-stretched state when the barrier is in the sealing position and in a stretched state when the barrier is in the non-sealing position; and
wherein when the attachment member separates from the flow control mechanism, the barrier returns from the non-sealing position to the sealing position by action of torque of the stretched flexible member as the flexible member returns to the non-stretched state.

3. The flow control mechanism of claim 2, wherein the housing defines opposing grooves for anchoring the flexible member.

4. The flow control mechanism of claim 3, wherein the flexible member includes boss ends that anchor the flexible member within the grooves.

5. The flow control mechanism of claim 1, wherein the housing defines opposing slots and the barrier includes opposing trunnion pins that extend perpendicularly to the through hole, and the trunnion pins are received within the opposing slots to permit the barrier to rotate and translate by movement of the trunnion pins within the slots.

6. The flow control mechanism of claim 1, wherein the housing includes a seat at an intersection of the through bore and the cavity, and the barrier has a sealing surface that rests against the seat when the barrier is in the sealing position.

7. The flow control mechanism of claim 6, wherein the barrier defines a barrier slot opposite to the sealing surface, and the actuating mechanism comprises an elastomeric band that extends through the barrier slot.

8. The flow control mechanism of claim 1, wherein the barrier is configured as a spherical sealing ball.

9. A flow control mechanism comprising:
a housing defining a through bore and a cavity contiguous with the through bore;
a barrier received within the cavity of the housing;
wherein the barrier is moveable between a sealing position in which fluid flow through the housing is permitted in one direction through the housing and blocked in an opposite direction, and a non-sealing position in which the flow control mechanism is configured to receive an attachment member; and
an actuating mechanism that returns the barrier from the non-sealing position to the sealing position when the attachment member separates from the flow control mechanism;
wherein the housing defines opposing slots and the barrier includes opposing trunnion pins that extend perpendicularly to the through hole, and the trunnion pins are received within the opposing slots to permit the barrier to rotate and translate by movement of the trunnion pins within the slots.

10. A flow control mechanism comprising:
a housing defining a through bore and a cavity contiguous with the through bore;
a barrier received within the cavity of the housing;
wherein the barrier is moveable between a sealing position in which fluid flow through the housing is permitted in one direction through the housing and blocked in an opposite direction, and a non-sealing position in which the flow control mechanism is configured to receive an attachment member; and
an actuating mechanism that returns the barrier from the non-sealing position to the sealing position when the attachment member separates from the flow control mechanism;
wherein the housing includes a seat at an intersection of the through bore and the cavity, and the barrier has a sealing surface that rests against the seat when the barrier is in the sealing position; and
wherein the barrier defines a barrier slot opposite to the sealing surface, and the actuating mechanism comprises an elastomeric band that extends through the barrier slot.

* * * * *